United States Patent
Wang et al.

(10) Patent No.: US 9,957,177 B2
(45) Date of Patent: May 1, 2018

(54) WASTEWATER TREATMENT METHOD AND EQUIPMENT USING A DUAL-DIFFUSION OXYGEN SUPPLY HORIZONTAL-FLOW BIOFILM

(75) Inventors: Rongchang Wang, Shanghai (CN); Yalei Zhang, Shanghai (CN); Jianfu Zhao, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 972 days.

(21) Appl. No.: 14/355,750

(22) PCT Filed: Dec. 31, 2011

(86) PCT No.: PCT/CN2011/085173
§ 371 (c)(1),
(2), (4) Date: May 1, 2014

(87) PCT Pub. No.: WO2013/063853
PCT Pub. Date: May 10, 2013

(65) Prior Publication Data
US 2014/0291239 A1 Oct. 2, 2014

(30) Foreign Application Priority Data
Nov. 4, 2011 (CN) .......................... 2011 1 0344299

(51) Int. Cl.
*C02F 3/04* (2006.01)
*C02F 3/10* (2006.01)
(Continued)

(52) U.S. Cl.
CPC .................. *C02F 3/12* (2013.01); *C02F 3/04* (2013.01); *C02F 3/101* (2013.01); *C02F 3/107* (2013.01);
(Continued)

(58) Field of Classification Search
CPC .. C02F 3/04; C02F 3/101; C02F 3/107; C02F 3/109; C02F 3/12; C02F 3/301;
(Continued)

(56) References Cited

U.S. PATENT DOCUMENTS

| 5,795,480 A * | 8/1998 | Keun ...................... C02F 3/006 210/151 |
| 2004/0060862 A1* | 4/2004 | Savage ..................... C02F 3/06 210/618 |
| 2010/0243565 A1* | 9/2010 | Isaka ....................... C02F 3/108 210/614 |

FOREIGN PATENT DOCUMENTS

| CN | 2587857 Y | 11/2003 |
| CN | 200999217 Y | 1/2008 |

(Continued)

OTHER PUBLICATIONS

International Search Report, dated Aug. 6, 2012.

*Primary Examiner* — Lucas Stelling
(74) *Attorney, Agent, or Firm* — Dority & Manning, P.A.

(57) ABSTRACT

A wastewater disposal method using a two-way oxygen supply horizontal-flow biofilm includes a carrier that is formed of a permeable material so that oxygen is supplied to the biofilm from the bottom layer of the biofilm adjacent to the surface of the carrier, so as to achieve a mode of simultaneously supplying oxygen from the surface layer and the bottom layer of the biofilm. Wastewater disposal equipment using a two-way oxygen supply horizontal-flow biofilm includes a water intake system, a reaction system and a water discharge system.

14 Claims, 1 Drawing Sheet

(51) Int. Cl.
*C02F 3/30* (2006.01)
*C02F 3/12* (2006.01)
*C02F 103/00* (2006.01)

(52) U.S. Cl.
CPC .............. *C02F 3/109* (2013.01); *C02F 3/301* (2013.01); *C02F 3/302* (2013.01); *C02F 3/308* (2013.01); *C02F 2103/002* (2013.01); *C02F 2209/001* (2013.01); *C02F 2209/40* (2013.01); *C02F 2209/44* (2013.01); *C02F 2301/02* (2013.01); *C02F 2303/24* (2013.01); *Y02W 10/15* (2015.05)

(58) Field of Classification Search
CPC .... C02F 3/302; C02F 3/308; C02F 2103/002; C02F 2209/001; C02F 2209/40; C02F 2209/44; C02F 2301/02; C02F 2303/24; Y02W 10/15
See application file for complete search history.

(56) References Cited

FOREIGN PATENT DOCUMENTS

| | | | |
|---|---|---|---|
| CN | 201016105 Y | 2/2008 | |
| CN | 101274805 A | 10/2008 | |
| JP | 2004-290848 A | 10/2004 | |
| WO | WO 2010014902 A1 * | 2/2010 | .............. C02F 3/101 |

* cited by examiner

WASTEWATER TREATMENT METHOD AND EQUIPMENT USING A DUAL-DIFFUSION OXYGEN SUPPLY HORIZONTAL-FLOW BIOFILM

CROSS-REFERENCE TO RELATED APPLICATIONS

This application claims priority to International Application Serial No. PCT/CN2011/085173, filed Dec. 31, 2011, which claims priority to Chinese Application No. 201110344299.9, filed Nov. 4, 2011. International Application Serial No. PCT/CN2011/085173 is hereby incorporated herein in its entirety for all purposes by this reference.

FIELD OF THE PRESENT INVENTION

This invention relates to the technical field of wastewater treatment, and more particularly to a wastewater treatment method and equipment using a biofilm.

BACKGROUND OF THE PRESENT INVENTION

The sewage treatment projects in suburban and rural areas are characterized by small water flow and large number. Due to the high content of organic matter, nitrogen and phosphorus, farmland runoff and wash water from human habitation pressures the environment, and excess nitrogen in drinking water directly threatens human health. The traditional treatment processes in large wastewater treatment plants play an important role, but for small-scale suburban and rural wastewater treatment, the traditional process needs large investment and large area, and is difficult to manage. Therefore, for suburban and rural wastewater treatment, it is necessary to develop a fast and convenient treatment solution.

Biofilm technology is a more popular wastewater treatment method. When the wastewater flows through a biofilm carrier, microorganisms attach to the surface of the carrier, grow and reproduce, and form the biofilm. Due to the contact with air, the surface of the biofilm is dissolved with more dissolved oxygen so as to form aerobic film. The inner layer of the film is dissolved with less oxygen and tends to form an anaerobic layer, and the whole film continues to grow, fall and regenerate. Microorganisms absorb the organic matter in the wastewater as a nutrient in the process of their growth and metabolism, thereby resulting in the degradation of the contaminants.

The traditional biofilm reactor is mostly a single stage reactor. Although it has compact and simple structure, the single stage reactor is not beneficial for the building of the growth environment for the dominant microbial groups with various functions and has a lower processing efficiency. There are also some researches on multi-stage biofilm reactor for wastewater treatment. For example, Chinese invention patent No. 200410013159.3, entitled "carrier circulating biological treating method for sewage treatment", utility model patent No. 200720022616.4, entitled "multi-dynamic membrane water purification device", and utility model Patent No. 200820100500.2, entitled "biofilm reactor for wastewater treatment" have disclosed various multi-stage biofilm reactors with different structures. However, the first and the second patent utilize single point intake water, and have the problem of lacking carbon, undesirable nitrogen removal and large quantity of chemical phosphorus removal sludge in the presence of denitrification; while the latter is a horizontal structure, which takes larger space, limits the layer number of biofilm and has a poor moving performance, thus it is not suitable for the portable requirements of rural families. In addition, the above reactors are submerged biofilm reactors, which need aeration to produce aerobic conditions, thus the energy consumption is relative high.

SUMMARY OF THE PRESENT INVENTION

In order to overcome the problem existing in the prior art, the present invention provides a wastewater treatment method and equipment which takes less space and is cheap and simple, that is, using a dual-diffusion oxygen supply horizontal-flow biofilm to remove the organic matter, nitrogen and phosphorus, thereby solving the wastewater treatment problem in suburban areas.

According to a first aspect of the present invention, a wastewater treatment method using a dual-diffusion oxygen supply horizontal-flow biofilm comprising the steps of:

a. wastewater entering a water intake tank, in which impurities and fibers with large particle diameter in the wastewater are initially filtered by mechanical action;

b. the initially filtered wastewater entering a biofilm reactor, in which the wastewater is disposed by the biofilm reactor; and c. discharged water from the biofilm reactor flowing into a water collection tank;

wherein the step b comprising:

performing activated sludge inoculation on a carrier arranged on a multilayer separating plate in the biofilm reactor so as to accelerate the formation of the biofilm, wherein activated sludge from a nitrifying wastewater treatment equipment is inoculated by multiple segments for consistent inoculation;

the wastewater flowing throughout the biofilm reactor, after the biofilm is fully adapted and acclimated, the wastewater successively horizontally flowing through the multilayer separating plate in the biofilm reactor according to a predetermined flow of the wastewater and simultaneous detecting of various wastewater indicators, adjusting the water inflow according to the results of the wastewater indicators, and when the wastewater flows through the carrier on the separating plate, microorganisms on the biofilm removes the organic matter, nitrogen and phosphorus in the wastewater;

wherein a surface layer of the biofilm has a large contact with air and has sufficient oxygen, so that microorganisms undergo aerobic respiration, while at a bottom layer of the biofilm adjacent to the surface of the carrier, since the carrier is formed of an air-permeable material, oxygen is supplied to the biofilm from the bottom layer of the biofilm adjacent to the surface of the carrier, as a result, a mode of simultaneously supplying oxygen from the surface layer and the bottom layer of the biofilm being achieved to enable the biofilm to have a high aerobic activity, and when the biofilm reaches a certain thickness, a hypoxic or anaerobic layer being formed in the middle layer of the biofilm and facilitating the removal of nitrogen and phosphorous compounds in the wastewater, at the same time an aged biofilm falling off from the carrier as the adhesion reduces, and the fallen aged biofilm, under the action of the water flow, being collected together with the discharged water, thus the biofilm functioning continuously and uninterruptedly.

Preferably, the wastewater has a hydraulic retention time of 6 to 9 hours in the biofilm reactor.

Preferably, the air-permeable material is stainless steel mesh, nylon mesh, silicone membrane, plastic orifice plate or permeable film, achieving simultaneously supplying oxygen from the surface layer and the bottom layer of the biofilm, enhancing the aerobic degradation activity and ammonia nitrogen nitrifying activity, largely increasing the pollutants degrading efficiency and reducing the volume of the reactor.

Preferably, the carrier is a grooved carrier or a bumped carrier. That is to say, the carrier may be provided with grooves or bumps to increase the contact area between the wastewater and the biofilm on the carrier.

According to a second aspect of the present invention, a wastewater treatment equipment using a dual-diffusion oxygen supply horizontal-flow biofilm, comprising a water intake system, a reaction system and a water discharge system, the wastewater flowing into the reaction system through the water intake system so as to be disposed in the reaction system, and then entering the water discharge system, wherein the water intake system comprises a water intake pump and a water intake tank, the water intake pump lifting the wastewater into the water intake tank, and the water intake pump performing an intermittent operation according to the water capacity in the water intake tank for controlling the flow and speed of the wastewater flowing into the reaction system, and performing a water intake through multiple points in different layers according to the carbon source content of water inflow so as to facilitate the denitrification, and the water intake tank comprising a grid for performing an initial filtering so as to filter large impurities;

wherein the reaction system comprises a three-dimensional biofilm reactor provided with multilayer separating plates therein, each layer of the separating plate supporting multiple carriers, and biofilm for removing the organic matter, nitrogen and phosphorus in the wastewater is formed on the carriers; and wherein the water discharge system comprises a water collection tank and a water discharge pump, the processed water outflow entering the water collection tank and being discharged through the water discharge pump.

Preferably, the carriers are a grooved carrier or a bumped carrier.

Preferably, the carriers are formed of a permeable material. For example, the permeable material may be stainless steel mesh, nylon mesh, silicone membrane, plastic orifice plate or permeable film.

Preferably, further comprising a flow meter arranged between the intake system and the reaction system.

Preferably, the separating plate is a polythene plate or a hard plate.

The present invention can have the following beneficial effects:

1. The present invention utilizes a one-piece biofilm reactor, and the aerobic and anaerobic processes may be performed in the same reactor, which can largely reduce the space. Moreover, the performing of the aerobic and anaerobic processes can remove the organic matter, nitrogen and phosphorus in the wastewater and has a good removal effect for the particles.

2. The aerobic and anaerobic processes are performed under natural conditions without artificial aeration, thereby omitting an aeration device.

3. The biofilm reactor of the present invention only consumes energy by pump operation in the water intake and discharge process, while other processes are performed automatically, thus the whole energy consumption is relative low. Moreover, the equipment has a three-dimensional structure and is easy to move.

1 water collection bucket; 2 water intake pump; 3 water intake tank: 4 flowmeter; 5 biofilm reactor; 6 carrier; 7 separating plate: 8 water collection tank; 9 water discharge pump.

DETAILED DESCRIPTION OF THE PREFERRED EMBODIMENTS

The following will describe the preferable embodiments of the wastewater treatment method and equipment using a dual-diffusion oxygen supply horizontal-flow biofilm in detail.

Figure 1:
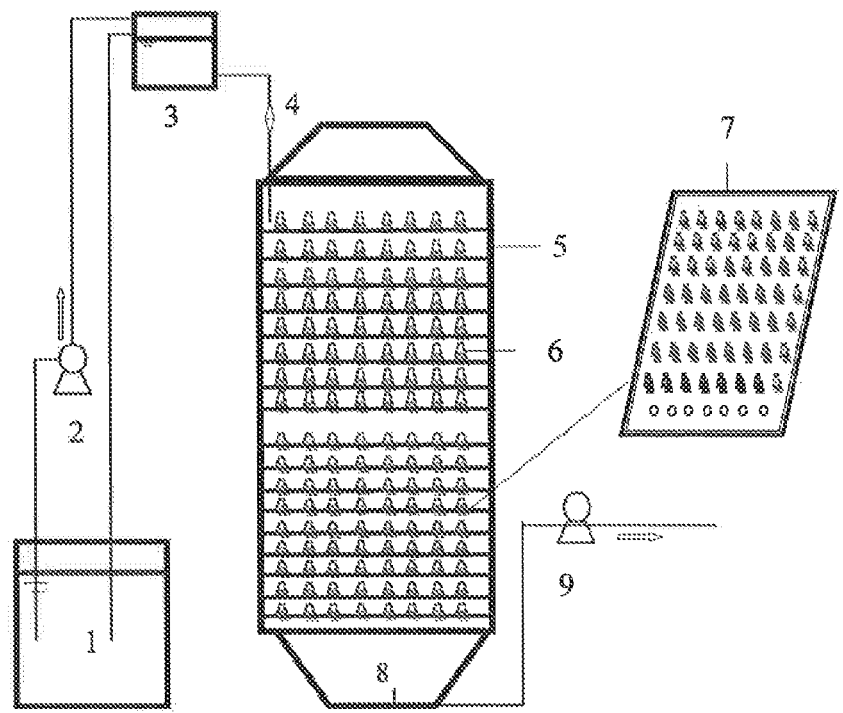
FIG. 1 is a schematic structure view of a wastewater treatment equipment using a dual-diffusion oxygen supply horizontal-flow biofilm according to one embodiment of the present invention.

As shown in FIG. 1, the wastewater treatment equipment of the present invention comprises a water intake system, a reaction system and a water discharge system. The wastewater flows into the reaction system through the water intake system so as to be disposed in the reaction system. The water intake system, the reaction system and the water discharge system may be connected via pipes.

The water intake system comprises a water intake pump 2 and a water intake tank 3. The water intake pump 2 serves to lift the wastewater in a water collection bucket 1 into the water intake tank 3. The water intake pump 2 performs an intermittent operation according to the water capacity in the water intake tank 3 for controlling the amount and speed of the wastewater flowing into the reaction system. The water intake tank 3 comprises a grid for an initial filtering so as to filter large impurities. Alternatively, the water collection bucket 1 is provided with grids therein so as to initially filter the impurities and fibers with large particle diameter in the wastewater.

The reaction system comprises a biofilm reactor 5. The biofilm reactor 5 may have a three-dimensional structure and comprise a steel structure frame below the water intake tank 3. The biofilm reactor 5 may be provided with multiple separating plates 7 such as polythene plates therein, and the number of the separating plates 7 may be adjusted according to the water conditions and loads. Each separating plate 7 supports multiple carriers 6, and the carriers 6 comprise biofilm formed by microorganisms for removing the organic matter, nitrogen and phosphorus in the wastewater. The carriers 6 may be flat carrier in the shape of cylinder, cone or other shapes. Preferably, the carriers 6 may be a grooved carrier or a bumped carrier. That is to say, the carrier may be provided with grooves or bumps so as to increase the contact area between the wastewater and the biofilm on the carrier. The carriers 6 are formed of a permeable material. For example, the permeable material may be stainless steel mesh, nylon mesh, plastic orifice plate or permeable film. As compared with the common carrier structure, the carrier of the present invention has a permeable mesh structure, which can achieve oxygen supply from the surface layer and the bottom layer of the biofilm, enhance the activity of the biofilm, especially the ammonia oxidation and nitration activity, and increase the removal efficiency for ammonia and nitrogen.

The water discharge system comprises a water collection tank 8 and a water discharge pump 9. The water collection tank 8 is arranged below the biofilm reactor 5. The water outflow enters the water collection tank 8 and is discharged through the water discharge pump 9.

Further, the wastewater treatment equipment may also comprises a flowmeter 4 for controlling the flow of the wastewater. The flowmeter 4 is arranged between the water intake tank 3 and the biofilm reactor 5.

The following will describe the wastewater treatment method with the above wastewater treatment equipment using a dual-diffusion oxygen supply horizontal-flow biofilm in detail.

The wastewater flows into the water collection bucket 1, wherein the impurities with large particle diameter may be blocked by the grid. Or, the wastewater in the water collection bucket 1 enters the water intake tank 3 by the water intake pump 2, and the impurities and fibers with large particle diameter in the wastewater are initially filtered by the grid in the water intake tank 3.

The flow of the water inflow may be determined by the flowmeter 4 based on water conditions of the water inflow, and the excessive wastewater flows back into the water collection bucket 1 by a backflow device (not shown).

The filtered wastewater enters the biofilm reactor 5, in which the wastewater is disposed by the biofilm reactor 5. An activated sludge inoculation is performed on the carrier 6 arranged on multilayer separating plate 7 in the biofilm reactor 5 so as to accelerate the formation of the biofilm, wherein activated sludge from a nitrifying wastewater treatment equipment is inoculated by multiple segments for consistent inoculation.

The wastewater flows throughout the biofilm reactor 5 at a relative low speed. After the biofilm is fully adapted and acclimated, the wastewater successively horizontally flows through the multilayer separating plate 7 in the biofilm reactor 5 according to a predetermined flow of the wastewater. Simultaneously, various wastewater indicators are detected, for example, chemical oxygen demand (COD), and the flow of the water inflow may be adjusted according to the results of the wastewater indicators. When the wastewater flows through the carrier 6 on the separating plate 7, the microorganisms on the biofilm remove the organic matter, nitrogen and phosphorus in the wastewater.

Wherein, a surface layer of the biofilm has a large contact with air and has sufficient oxygen, so that microorganisms undergo aerobic respiration. At a bottom layer of the biofilm adjacent to the surface of the carrier 6, since the carrier 6 is a permeable biofilm carrier formed of permeable film or mesh, oxygen is supplied to the biofilm from the bottom layer of the biofilm adjacent to the surface of the carrier. As a result, a mode of simultaneously supplying oxygen from the surface layer and the bottom layer of the biofilm is achieved, and the biofilm has a high aerobic activity. When the biofilm reaches a certain thickness, a hypoxic or anaerobic layer is formed at the middle layer of the biofilm and facilitates the removal of pollutants such as nitrogen and phosphorous compounds in the wastewater, at the same time an aged biofilm falls off from the carrier as the adhesion reduces, and the fallen aged biofilm, under the action of the water flow, is collected together with the discharged water, thus the biofilm can function continuously and uninterruptedly.

Then, the clean water outflow enters the water collection tank 8 and is discharged by the water discharge pump 9. Finally, the water outflow can meet the water quality requirements, thereby ensuring the water outflow can meet the emission norms.

Preferably, the wastewater has a hydraulic retention time of 6 to 9 hours in the biofilm reactor 5.

Figure 2:
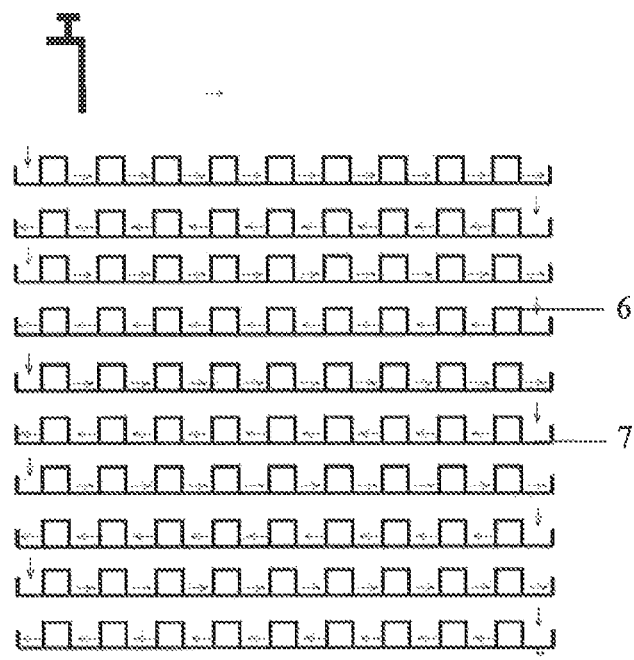
FIG. 2 is a schematic view showing the flowing of the wastewater in the biofilm reactor of the wastewater treatment equipment of FIG. 1.

FIG. 2 illustrates the flowing process of the wastewater in the biofilm reactor 5. The wastewater enters the biofilm reactor 5 via a valve by flowing in a horizontal direction. The wastewater flows through a layer of separating plate and then collides with the stopping wall of the reactor so that the wastewater is guided to flow towards the carriers on the next layer of the separating plate, thus the wastewater may flow through the carriers on each layer of the separating plate. The wastewater contacts the biofilm on the carriers 6 so that the contamination may be absorbed by the carriers 6.

The present invention has the advantage of entering water through multiple points and taking less space, does not need an aeration device, and can form by itself different types of microorganism areas such as an anaerobic area and an aerobic area, which can make the best use of the space condition and enhance the wastewater load and wastewater treatment effect in different degrees. Moreover, the present invention has a simple process, small volume, fast movement, convenient operation, quick treatment and low energy consumption, which is wastewater treatment equipment suitable for the small-scale wastewater treatment in suburban and urban areas. Moreover, such equipment is also a temporary application water treatment equipment capable of meeting the requirements and making a quick response.

The above description has disclosed the technical contents and features of the present invention. However, it should be understood that under the creative spirit of the present invention, the person skilled in the art may modify and change the above structures, and these modifications and changes are contained in the protection scope of the present invention. The above embodiments are illustrative rather than limiting, and the protection scope of the present invention may be determined by the attached claims.

What is claimed is:

1. A wastewater treatment method using a dual-diffusion oxygen supply horizontal-flow biofilm, comprising the steps of:
   a. wastewater entering a water intake tank, in which impurities and fibers with large particle diameter in the wastewater are initially filtered by mechanical action;
   b. the initially filtered wastewater entering a biofilm reactor, in which the wastewater is disposed by the biofilm reactor; and
   c. discharged water from the biofilm reactor flowing into a water collection tank;
   wherein the step b comprising:
   performing activated sludge inoculation on a carrier arranged on a multilayer separating plate in the biofilm reactor so as to accelerate the formation of the biofilm, wherein activated sludge from a nitrifying wastewater treatment equipment is inoculated;
   the wastewater flowing throughout the biofilm reactor, after the biofilm is fully adapted and acclimated, the wastewater successively horizontally flowing through the multilayer separating plate in the biofilm reactor according to a predetermined flow of the wastewater and simultaneously detecting various wastewater indicators, adjusting the water inflow according to the results of the wastewater indicators, and when the wastewater flows through the carrier on the separating plate, microorganisms on the biofilm remove the organic matter, nitrogen and phosphorus in the wastewater;

wherein a surface layer of the biofilm has a large contact with air and has sufficient oxygen so that microorganisms undergo aerobic respiration, while at a bottom layer of the biofilm adjacent to the surface of the carrier, since the carrier is formed of a permeable material, oxygen is supplied to the biofilm from the bottom layer of the biofilm adjacent to the surface of the carrier, as a result, a mode of simultaneously supplying oxygen from the surface layer and the bottom layer of the biofilm being achieved to enable the biofilm to have a high aerobic activity, and when the biofilm reaches a certain thickness, a hypoxic or anaerobic layer being formed in the middle layer of the biofilm and facilitating the removal of nitrogen and phosphorous compounds in the wastewater, at the same time an aged biofilm falling off from the carrier as the adhesion reduces, and the fallen aged biofilm, under the action of the water flow, being collected together with the discharged water, whereby the biofilm functions continuously and uninterruptedly.

2. The wastewater treatment method according to claim 1, wherein the wastewater has a hydraulic retention time of 6 to 9 hours in the biofilm reactor.

3. The wastewater treatment method according to claim 1, wherein the permeable material is selected from one of the following filtering materials: stainless steel mesh, nylon mesh, plastic orifice plate and permeable permeable film.

4. The wastewater treatment method according to claim 1, wherein the carrier is a grooved carrier or a bumped carrier.

5. The wastewater treatment method according to claim 1, wherein the carrier is a bumped carrier.

6. The wastewater treatment method according to claim 2, wherein the carrier is a grooved carrier.

7. The wastewater treatment method according to claim 2, wherein the carrier is a bumped carrier.

8. The wastewater treatment method according to claim 3, wherein the carrier is a grooved carrier.

9. The wastewater treatment method according to claim 3, wherein the carrier is a bumped carrier.

10. A wastewater treatment equipment using a dual-diffusion oxygen supply horizontal-flow biofilm, comprising:

a water intake system including a water intake tank and a water intake pump connected to the water intake tank so that operation of the water intake pump lifts the wastewater into the water intake tank, the water intake pump being configured for controlling the flow and speed of the wastewater being lifted into the water intake tank by being configured to operate intermittently according to the water capacity in the water intake tank, the water intake tank including a grid configured for performing an initial filtering so as to filter large impurities;

a reaction system disposed so that the wastewater flowing through the water intake system becomes disposed in the reaction system, the reaction system including a three-dimensional biofilm reactor having a plurality of separating plates, each separating plate extending generally in a horizontal direction and being spaced apart in a vertical direction from each adjacent separating plate, each separating plate supporting a plurality of carriers formed of a permeable material that includes a stainless steel mesh, a nylon mesh or a permeable film, each of the plurality of carriers defining a raised upper surface, the reaction system including biofilm for removing organic matter, nitrogen and phosphorus in the wastewater, a lower layer of the biofilm being formed on the raised upper surfaces of the carriers; and a water discharge system disposed so that the wastewater flowing through the reaction system becomes disposed in the discharge system, wherein the water discharge system includes a water collection tank and a water discharge pump connected to the water collection tank so that water entering the water collection tank from the biofilm reactor is discharged through the water discharge pump.

11. The wastewater treatment equipment according to claim 10, wherein the carriers is a bumped carrier.

12. The wastewater treatment equipment according to claim 10, further comprising a flowmeter arranged between the intake system and the reaction system.

13. The wastewater treatment equipment according to claim 10, wherein the separating plate is a polythene plate.

14. The wastewater treatment equipment according to claim 10, wherein the separating plate is a hard plate.

* * * * *